United States Patent [19]

Peng

[11] Patent Number: 4,805,737

[45] Date of Patent: Feb. 21, 1989

[54] LADDER POSITIONING MECHANISM

[76] Inventor: Ching L. Peng, No. 11, Alley 26, Lane 207, Tung Shan Street, Taichung City, Taiwan

[21] Appl. No.: 122,202

[22] Filed: Nov. 18, 1987

[51] Int. Cl.⁴ .......................... F16C 11/00; E06C 7/50
[52] U.S. Cl. ...................................... 182/163; 403/93; 16/332
[58] Field of Search ...................... 182/21, 22, 24, 163; 16/332, 334, 349, 324; 403/93, 95

[56] References Cited

U.S. PATENT DOCUMENTS

| | | | |
|---|---|---|---|
| 4,152,810 | 5/1979 | Martinez | 182/24 |
| 4,474,264 | 10/1984 | Krause | 182/163 |
| 4,540,306 | 9/1985 | Wang | 182/163 |
| 4,543,006 | 9/1985 | Wang | 182/163 |
| 4,645,371 | 2/1987 | Wang | 182/163 |
| 4,666,328 | 5/1987 | Ryu | 182/23 |

Primary Examiner—Reinaldo P. Machado
Attorney, Agent, or Firm—Morton J. Rosenberg

[57] ABSTRACT

This invention directs itself to an improved ladder positioning mechanism which includes an external shell member (1) in combination with an internal shell member (2) rotatably displaceable each with respect to the other. A claw member (4) is insertable within the external shell member (1) and is rotatable to linearly displace a lock block member (37) into and out of slots (22) formed in a peripheral surface of the internal shell member (2). The lock block member (37) is coupled through a shaft (36) to a ball shaped edge member (33) which is insertable within a pair of biased arm members (323) and (324) formed within an engagement seat (32).

1 Claim, 6 Drawing Sheets

LADDER POSITIONING MECHANISM

BACKGROUND OF THE INVENTION

This invention pertains to improvements in ladder positioning mechanism adapted for use with folding ladders and in particular aluminum ladders. In general, prior art ladder positioning mechanisms utilized a circular cake shell body structure which will be discussed in following paragraphs. The subject invention directs itself to a ladder positioning mechanism which provides for additional safety features over prior art systems and allows for precise positioning with the addition of low production cost to allow mass production.

Prior art aluminum ladders which are commercially available may be of the folding type and are extensively used. However, due to the structural complexities of prior art ladders, their fabrication has led to high production costs and utilization by the consumer is somewhat complex.

Existing defects found in the fabrication and use of various ladder positioning mechanisms such as that shown in Taiwan Pat. Reg. No. 55, 960 have been found to be complicated and is shown in FIGS. 1 and 2 which will be discussed in following paragraphs.

An object of this invention is to provide a ladder positioning mechanism for ladders and in particular aluminum ladders which includes a simply derived structure combination and excellent positioning mechanism for the legs of a ladder.

The ladder positioning mechanism of the subject invention concept provides for a double-functioning positioning device which allows for a safer and more practical positioning objective between the legs of a ladder.

SUMMARY OF THE INVENTION

A ladder positioning mechanism includes an external shell member having a tube shaped handle. The ladder positioning mechanism also includes an internal shell member which is rotatably mounted within the external shell member. The internal shell member has predetermined slots formed in a peripheral boundary surface. A claw member is insertable within the external member and has a pair of rounded spaced apart ends sandwiching the internal shell member therebetween. A positioning mechanism is provided for positioning the internal shell member with respect to the external shell member. The positioning mechanism is located within the tube shaped handle of the external shell member. The positioning mechanism further includes a lock block member which is linearly displaceable into and out of the slots formed in the internal shell peripheral surface responsive to a rotative displacement of the claw member. The lock block member is fixedly secured to a shaft which extends through an opening formed in a fixed seat member secured to the tube shaped handle. The shaft passes through a spring member which is compressively mounted between the lock block and the fixed seat member on opposing ends of the spring. The shaft has a bell shaped edge member secured to an end of the shaft. The bell shaped edge member is reversibly insertable into an engagement seat formed by a pair of laterally displaced face plate members which are displaceably coupled each to the other by a spacer spring member. The face plate members clampingly engage the bell shaped edge member when the lock block member is inserted within one of the slots.

DESCRIPTION OF THE PREFERRED EMBODIMENTS

Figure 1:
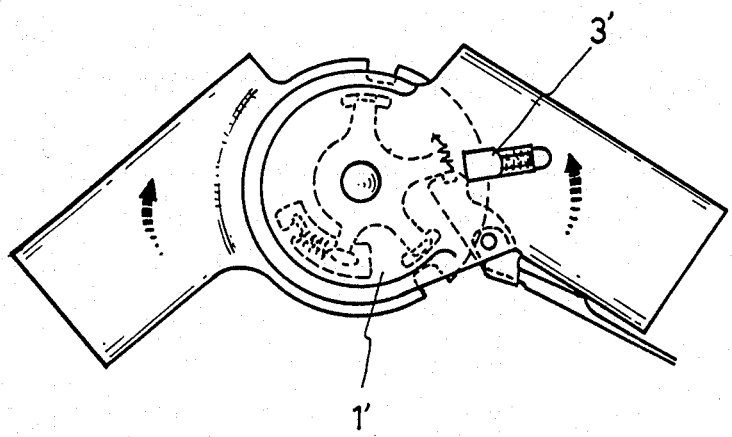
FIG. 1 is an elevational view of a prior art ladder positioning mechanism.
Figure 2:
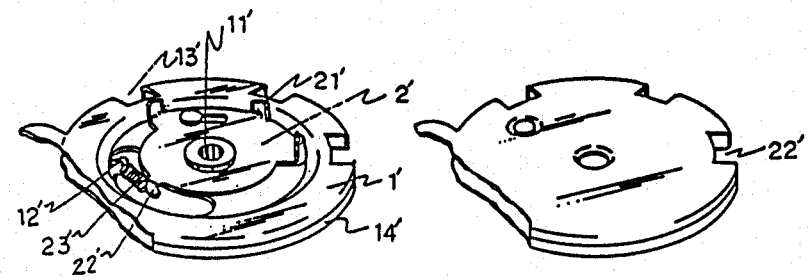
FIG. 2 is a perspective view of the prior art ladder positioning mechanism component elements.
Figure 3:
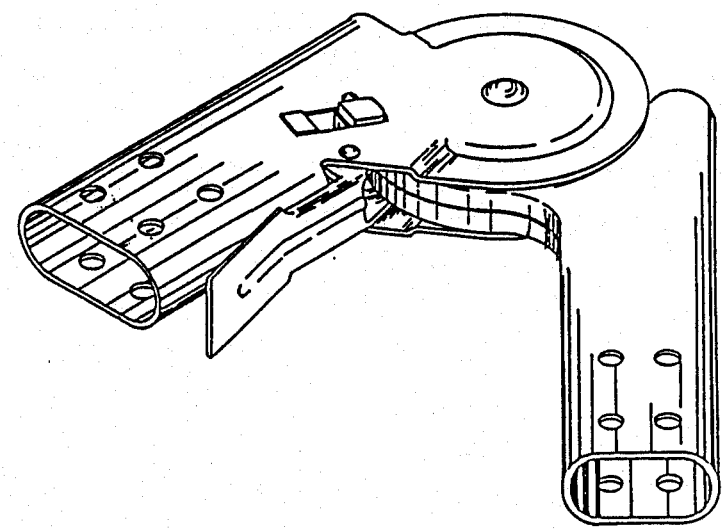
FIG. 3 is a perspective view of the subject ladder positioning mechanism.
Figure 4:
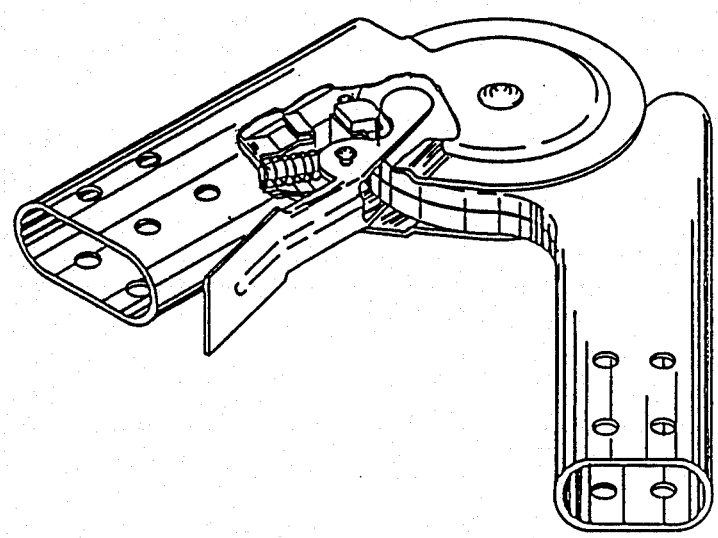
FIG. 4 is a perspective view, partially in cutaway showing the subject ladder positioning mechanism.

Referring now to FIGS. 1 and 2, there is shown a conventional prior art ladder positioning mechanism. In the prior art ladder positioning mechanism, there is provided a round cake shell body 1' which includes a pivot axis 11' shown in FIG. 2. Claw plate 2' is rotatably displaceable around pivot axis 11'. At a rear portion of claw plate 2' there is provided upwardly extending claw arm members 21' and a hook 22' mounted over one end of claw arm member 21' and an opposing end 12' which sandwiches the pull spring 23'.

The hook member 12' is positionally located on the round cake shell body 1' and a groove shaped gap is provided to allow for extension and retraction of the spring 23'. This has provided for extensive complexity in the fabrication which has raised the overall cost of production of such prior art positioning mechanisms.

Additionally, the elasticity of spring member 23' is generally lost over a period of time which generally makes the insertion of locking block member 3' into a positioned opening 13' very difficult and somewhat problematical. Thus, the locking block 3' oftentimes only presses against the peripheral surface of the oval shaped end 14' without being insertable within the positioning slots 13'.

Referring now to FIGS. 2-6 there is shown the subject invention ladder positioning mechanism. Clearly seen in FIG. 5, the subject ladder positioning mechanism includes an external shell member 1 in combination with an internal shell member 2 and a mechanism for postioning the internal shell member with respect to the external shell member that results in an increased reliably acceptable positioning mechanism having a minimum of components.

As will be seen in following paragraphs and as has been previously discussed, comparisons between the subject ladder positioning mechanism and prior art systems as shown in FIGS. 1 and 2 are quire clear in that in the subject ladder positioning mechanism, there is a plurality of positionally spaced openings 22 formed within a peripheral surface of internal shell member 2 which allows engagement of lock block member 37. In contradistinction, the related structure of the prior art as has been discussed is a far more complicated type system which reduces reliability and increases fabrication costs.

Figure 5:
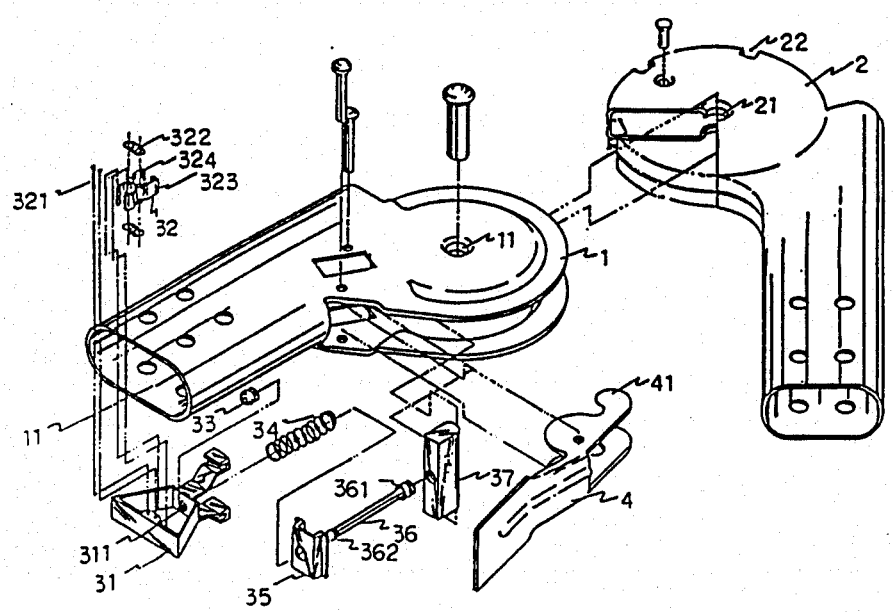
FIG. 5 is a perspective exploded view of the subject ladder positioning mechanism; and, FIG. 6 is a schematic view of the subject ladder positioning mechanism.

The subject invention includes internal shell member 2 which is mounted within an external shell member 1. The external shell member 1 includes a tube shaped handle section 11 as is shown in FIG. 5. Additionally, internal shell member 2 includes a number of positionally located slots 22 formed in a peripheral surface as is shown in FIG. 5. Clearly, it is seen that internal shell member 2 is insertable within the spaced apart substantially planar end plates of external shell member 1.

A pin member passes through pivot axis 11, 21 to allow rotative displacement of internal shell member 2 with respect to external shell member 1.

Additionally, claw member 4 is insertable within external member 1 and it includes a pair of rounded spaced apart ends 41 sandwiching internal shell member 2 therebetween. Claw member 4 is rotatably displaceable with respect to external shell member 1 as is clearly seen in FIGS. 5 and 6.

In this manner, and in assembly, internal shell member 2 is insertable between the end plates of external shell member 1 and both are rotatable about the axes 11, 21. Additionally, claw member 4 is insertable within external shell member 1 and has end plates which pass on opposing upper and lower surfaces of internal shell member 2. As will be seen, rotation of claw member 4 linearly displaces lock block member 37 for purposes to be described in following paragraphs.

The mechanism for positioning internal shell member 2 with respect to external shell member 1 is positionally located internal to the tube-shaped external portion of external shell member 1 as is seen in FIG. 5. The positioning mechanism is formed by a fixed seat member 31 in combination with an engagement seat member 32 as well as a ball-shaped edge member 33.

Figure 6:
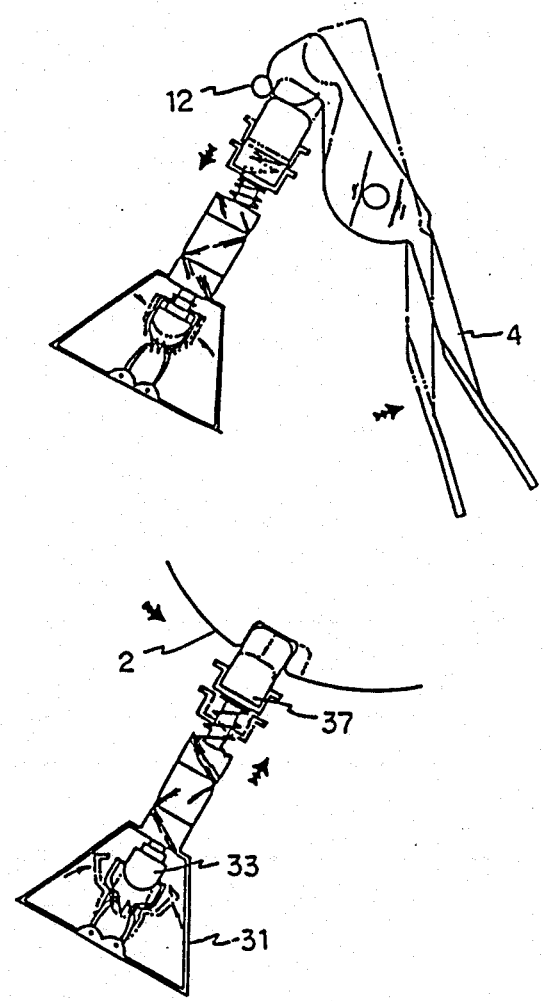

In overall assembly, the overall positioning mechanism includes lock block member 37 which is linearly displaceable responsive to contact and rotative displacement of claw member 4 as is seen in FIG. 6. Lock block member 37 is reversibly insertable into slot opening 22 formed on internal shell member 2 as is seen.

Lock block member 37 is fixedly secured to shaft 36 at end 361 through threaded securement or some other fixed securement not important to the inventive concept as herein described. Catch seat member 35 having a central opening passes through and surrounds shaft member 36 for bearing against the undersurface of lock block member 37 as is seen in FIGS. 5 and 6. Spring member 34 passes around shaft member 36 and bears on opposing ends with an undersurface of catch seat member 35 and fixed seat member 31.

Fixed seat member 31 is secured to the internal portion of the tubular handle of external shell member 1. Shaft member 36 extends through opening 311 formed in fixed seat member 31 as shown in FIG. 5. Ball shaped edge member 33 is mounted and secured to threaded end 362 of shaft member 36.

Ball shaped edge member 33 is reversibly insertable into engagement seat 32 formed by a pair of laterally displaced face plate members 324 and 323 which are displaceably coupled to each other by spacer spring member 322. Pin members 321 are insertable into fixed seat member 31 at a base section as is shown in FIG. 5 to allow coupling of face plate members 323 and 324 each to the other.

In the manner described, face plate members 323 and 324 are adapted to clampingly engage ball shaped edge member 33 when lock block member 37 is inserted into one of the slots 22 formed within the peripheral surface of internal shell member 2.

The operational system is schematically shown in FIG. 6 which shows rotation of claw member 4 with respect to a central pin member 12 passing through axis openings 11 and 21. As claw member 4 is rotated, it bears against lock block member 37 and linearly displaces it as is shown by the phantom line drawing of FIG. 6. Additionally, ball shaped edge member 33 is displaced internal to engagement seat member 32 between opposing space arms 323 and 324. When claw member 4 has displaced lock block member 37 out of slot openings 22, internal shell member 2 is free to rotate with respect to external shell member 1. Upon release of claw member 4, lock block member 37 is moved into one of slots 22 under the biasing force of spring member 34. Face plate arms 323 and 324 clampingly engage ball shaped edge member 33 to provide a double safety system for maintaining lock block member 37 within the predetermined slot 22.

It is clearly seen that spring member 322 is provided for biasing the face plate members 324 and 323 into a compressive position. It is believed with this additional safety concept, the subject ladder positioning mechanism relieves various defects in claw plate designs as provided in FIGS. 1 and 2. In such prior systems, there has always been a danger caused by the possible springing back of a conventional claw plate due to wear on the spring member. In the subject concept, the additional clamping and holding of the lock block member 37 provides additional safety features.

I claim:

1. A ladder positioning mechanism comprising:
an external shell member having a tube shaped handle;
an internal shell member rotatably mounted within said external shell member, said internal shell member having predetermined slots formed in a peripheral surface;
a claw member insertable within said external member and having a pair of rounded spaced apart ends sandwiching said internal shell member therebetween;
means for positioning said internal shell member with respect to said external shell member, said positioning means being located within said tube shaped handle of said external shell member, said positioning means including a lock block member being linearly displaceable into and out of said slots formed in said internal shell peripheral surface responsive to a rotative displacement of said claw member, said lock block member fixedly secured to a shaft extending through an opening formed in a fixed seat member secured to said tube shaped handle, said shaft passing through a spring member being compressively mounted between said lock block member and said fixed seat member on opposing ends thereof, said shaft having a ball shaped edge member secured to an end thereof, said ball shaped edge member being reversibly insertable into an engagement seat formed by a pair of laterally displaced face plate members displaceably coupled to each other by a spacer spring member, said face plate members for clampingly engaging said ball shaped edge member when said lock block member is inserted within one of said slots.

* * * * *